(12) United States Patent
Gaviani et al.

(10) Patent No.: US 7,003,396 B2
(45) Date of Patent: Feb. 21, 2006

(54) CONTROL SYSTEM WITH MULTIPROCESSOR ARCHITECTURE FOR AN INTERNAL COMBUSTION POWERTRAIN

(75) Inventors: Giovanni Gaviani, Rimini (IT); Paolo Marceca, Bologna (IT); Michele Pennese, Medicina (IT)

(73) Assignee: Magneti Marelli Powertrain S.p.A., (IT)

( * ) Notice: Subject to any disclaimer, the term of this patent is extended or adjusted under 35 U.S.C. 154(b) by 9 days.

(21) Appl. No.: 10/709,363

(22) Filed: Apr. 29, 2004

(65) Prior Publication Data
US 2004/0260448 A1 Dec. 23, 2004

(30) Foreign Application Priority Data
Apr. 30, 2003 (IT) ............... BO2003A0256

(51) Int. Cl.
*G06G 7/70* (2006.01)
(52) U.S. Cl. .................. 701/114; 701/115; 700/5
(58) Field of Classification Search ............... 701/102, 701/115, 114; 700/2–5
See application file for complete search history.

(56) References Cited
U.S. PATENT DOCUMENTS
5,367,665 A 11/1994 Koch et al. ............... 395/575
5,454,095 A 9/1995 Kraemer et al. ....... 364/431.05
5,455,920 A 10/1995 Muramatsu ............ 395/200.08

FOREIGN PATENT DOCUMENTS
GB 0 465 793 A2 1/1992
GB 2256504 A 12/1992

OTHER PUBLICATIONS
European Search Report for EP 04 10 180 (Jun. 30, 2004).

*Primary Examiner*—Andrew M. Dolinar
*Assistant Examiner*—Johnny H. Hoang
(74) *Attorney, Agent, or Firm*—Howrey LLP

(57) ABSTRACT

A control system with multiprocessor architecture for an internal combustion powertrain is disclosed. The control system has a computing unit capable of executing both basic control functions of the powertrain and ancillary control functions not directly related to the control of the powertrain. The computing unit comprises a main processor, which is dedicated to executing basic functions for controlling the powertrain, at least one auxiliary processor, which is dedicated to executing ancillary control functions, a number of memories, a series of peripheral devices, at least one peripheral bus connection, to which the peripheral devices are connected, and an intelligent main bus connection of the cross-bar bus type to allow the processors to communicate with the memories and with the peripheral bus connection.

4 Claims, 2 Drawing Sheets

US 7,003,396 B2

CONTROL SYSTEM WITH MULTIPROCESSOR ARCHITECTURE FOR AN INTERNAL COMBUSTION POWERTRAIN

CROSS REFERENCE TO RELATED APPLICATIONS

The present application claims priority to Italian Patent Application Serial No. BO2003A 000256 filed Apr. 30, 2003, the contents of which are incorporated herein by reference.

BACKGROUND OF INVENTION

1. Field of the Invention

The present invention relates to a control system with multiprocessor architecture for an internal combustion powertrain.

2. Description of Related Art

Known powertrains comprise a control system that is capable of supervising the operation of the entire powertrain and comprises a single-processor computing unit having just one processor. In the great majority of cases, a powertrain manufacturer purchases the control system from an external supplier and requests said supplier to ensure that it is possible to implement control functions in the control system, which functions are intended for electronic devices produced by the powertrain manufacturer.

Typically, the producer of the control system tends to oversize the computing capacity and interconnectivity capacity of the computing unit in order to allow the engineers of the powertrain manufacturer to use the computing unit to implement control functions which they have developed themselves. However, the above-described solution of oversizing the computing capacity of a single-processor computing unit often proves inadequate in that execution of the control functions developed by the engineers of the powertrain manufacturer may interfere negatively with the execution of the powertrain control developed by the producer of the control system. Moreover, increasing the computing capacity of a single-processor computing unit can be achieved by modifying the internal architecture of the processor or by increasing the operating frequency of the processor itself; however, modifying the internal architecture of the processor is extremely costly, while increasing the operating frequency of the processor can complicate data exchange by means of existing buses that are designed to operate at a specific operating frequency.

U.S. Pat. No. 5,367,665 A1 (issued Nov. 22, 1994) discloses a multi-processor system for a motor vehicle and having at least two processors; the system carries out a first sequence of steps when power is switched on and, for a restart during operation, executes a second sequence of steps (the system distinguishes between power on and a restart and selects, the corresponding step sequence). In addition, a check is provided as to whether the number of resets of a processor has exceeded a pregiven threshold; in this case, a processor is transferred into the standby state for the operating cycle, which is then running.

U.S. Pat. No. 5,454,095 A1 (issued Sep. 26, 1995) discloses a multi-processor system, which has at least two processors jointly accessing the same memory and is useful for controlling processes of motor vehicles. The system memory is divided into at least two sectors, so as a first processor accesses one memory sector only in the read mode and a second processor accesses it only in the write mode; the second processor accesses the other memory sector only in the read mode and the first processor accesses it only in the write mode. The processors are synchronized in such a way that the processors access the memory in the same way at the same time.

SUMMARY OF INVENTION

An object of the present invention is to provide a control system with multiprocessor architecture for an internal combustion powertrain, which does not have the above-described disadvantages and, in particular, is easily and economically implemented.

The present invention provides a control system with multiprocessor architecture for an internal combustion powertrain as recited in the attached claims.

BRIEF DESCRIPTION OF DRAWINGS

The present invention will now be described with reference to the attached drawings, which illustrate a non-limiting embodiment of the invention, in which.

DETAILED DESCRIPTION

Figure 1:
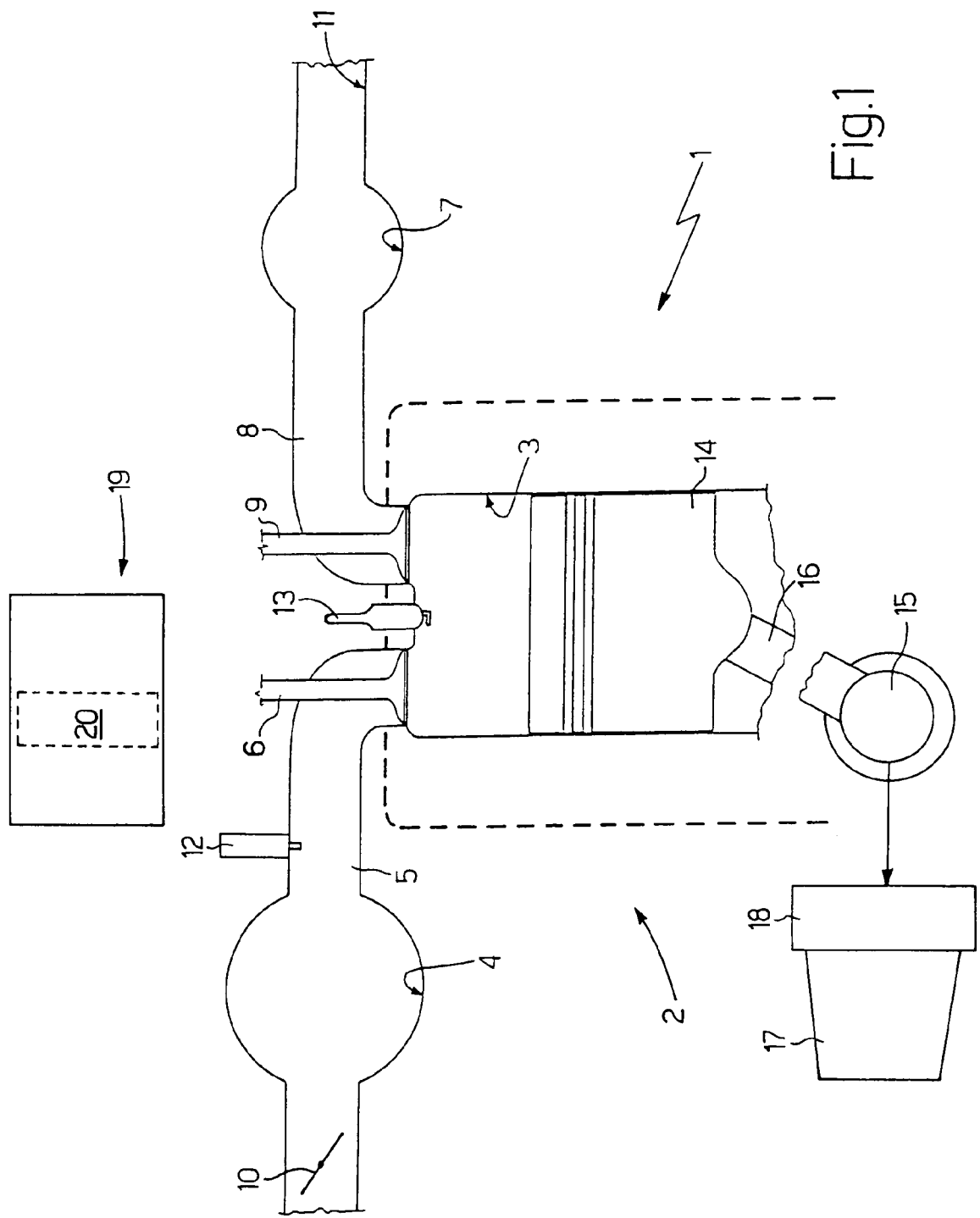
FIG. 1 is a schematic diagram of an internal combustion powertrain equipped with the control system with multiprocessor architecture that is the subject matter of the present invention.

In FIG. 1, 1 denotes the overall internal combustion powertrain for a road vehicle (not shown); the powertrain 1 comprises an engine 2 equipped with four cylinders 3 (only one of which is shown in FIG. 1), each of which is connected to an intake manifold 4 via a respective intake duct 5 controlled by at least one respective intake valve 6 and to an exhaust manifold 7 via a respective exhaust duct 8 controlled by at least one respective exhaust valve 9. The intake manifold 4 receives fresh air (i.e. air originating from the outside environment) via a throttle valve 10 that is adjustable between a closed position and a maximally open position; from the exhaust manifold 7 there leaves an exhaust device 11 equipped with one or more catalytic converters (not shown in detail) to discharge into the atmosphere the gases produced by combustion in the cylinders 3.

Four injectors 12 (one for each cylinder 3) are coupled to the respective intake ducts 5 in order to inject petrol cyclically into said intake ducts 5; moreover, four spark plugs 13 (one for each cylinder 3) are coupled to the respective cylinders 3 in order cyclically to bring about ignition of the mixture present inside said cylinders 3.

Each cylinder 3 is coupled to a respective piston 14, which is capable of running linearly along the cylinder 3 and is mechanically connected to a powertrain crankshaft 15 by means of an associated connecting rod 16; in turn, the powertrain crankshaft 15 is mechanically connected to a gearbox 17 by means of an interposed clutch 18 in order to transmit drive torque to the drive wheels of the motor vehicle (not shown).

Figure 2:
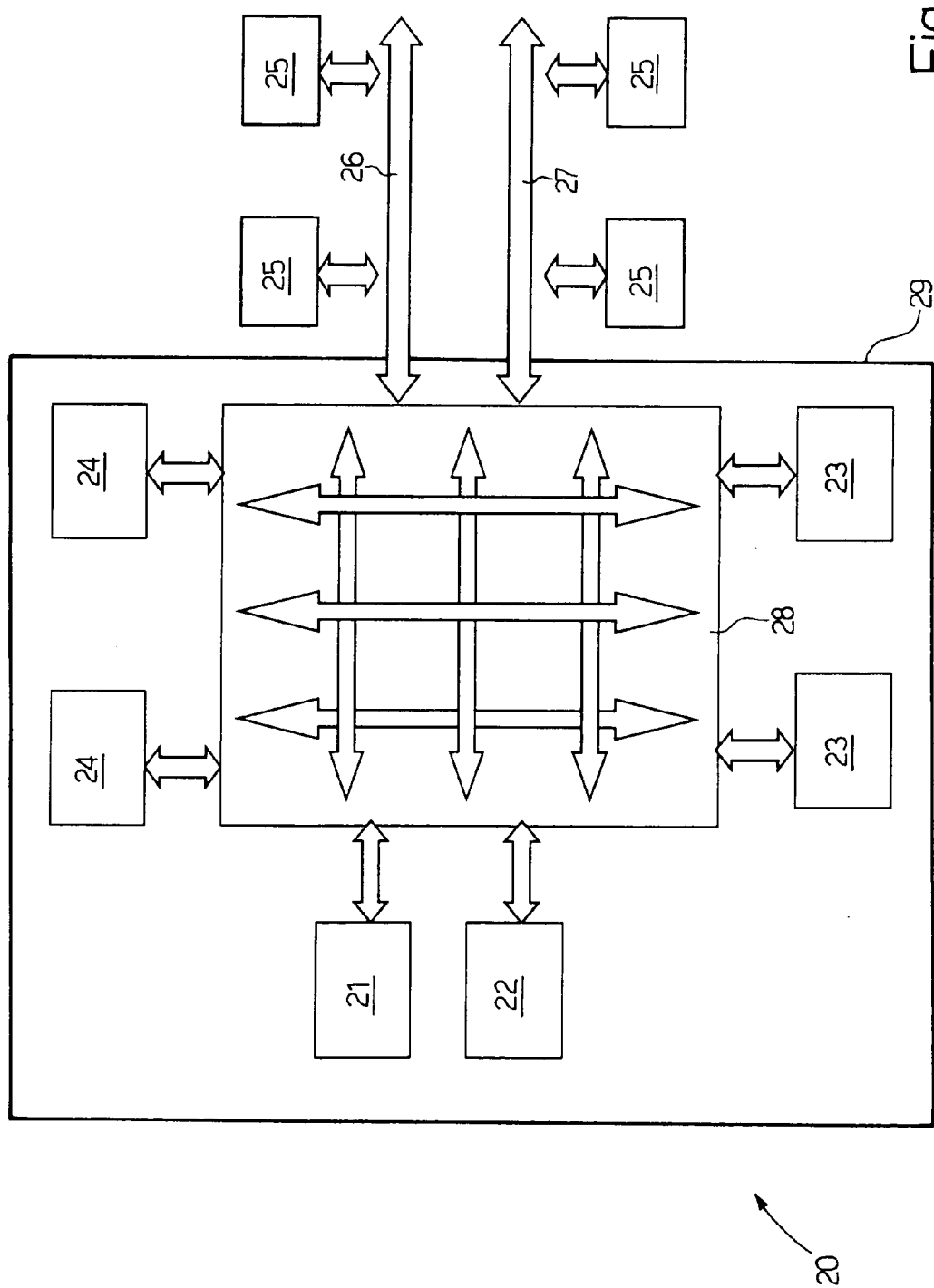
FIG. 2 is a block diagram of the internal architecture of a computing unit of the control system of FIG. 1.

A control system 19 is associated with the powertrain 1, said system being capable of supervising the operation of the entire powertrain 1, i.e. the operation of the engine 2, clutch 18 and gearbox 17. The control system 19 comprises a computing unit 20 capable of executing both basic control functions of the powertrain 1 and ancillary control functions not directly related to the control of the powertrain 1. The basic control functions of the powertrain 1 are the control functions related to the production and transmission of drive torque, such as calculating and actuating the injection time, calculating and actuating the ignition advance, monitoring the composition of the exhaust gases, actuating the clutch 18 and the gearbox 17. The ancillary control functions not directly related to the control of the powertrain 1 are control functions that are not implemented by the manufacturer of the control system 19 at the time of manufacture of the control system 19, but that may or may not be implemented by the manufacturer of the powertrain 1 after the manufacture of the control system 19. As shown in FIG. 2, the computing unit 20 comprises a main processor 21 intended to execute basic control functions of the powertrain 1, at least one auxiliary processor 22 intended to execute ancillary control functions, a number of RAM type memories 23, a number of ROM type memories 24, a series of peripheral devices 25 of known type, a pair of peripheral bus connections 26 and 27 to which the peripheral devices 25 are connected in a known manner, and a main bus connection 28 through a cross-bar switch of the cross-bar bus type in order to allow the processors 21 and 22 to communicate with the memories 23 and 24 and with the peripheral bus connections 26 and 27 while avoiding the occurrence of conflicting communication operations by means of suitable access arbitration. According to an alternative embodiment, not shown, the computing unit 20 comprises further auxiliary processors 22.

The computing unit 20 preferably comprises a single integrated circuit 29 that accommodates the processors 21 and 22, the memories 23 and 24, the main bus connection 28 and the peripheral bus connections 26 and 27, so providing an architecture generally known as "system on chip".

In general, the peripheral bus connection 26 is intended for connecting slow peripheral devices 25, such as "CAN", "SPI" and "TIMER UNIT" devices, while the peripheral bus connection 27 is intended for connecting high speed peripheral devices 25, such as "A/D CONVERTER" and "DMA" devices.

It is important to emphasize that the auxiliary processor 22 can execute inter-processor interrupt operations in order to wait for the main processor 21 to complete a particular computing algorithm; however, the opposite is not usually true, i.e. the main processor 21 should never have to wait for the auxiliary processor 22 to complete a particular computing algorithm. To state matters more clearly, it is theoretically possible for the main processor 21 to wait for the auxiliary processor 22 to complete a particular computing algorithm by using an inter-processor interrupt operation, but this option should not be used in order to ensure that the execution of basic control functions of the powertrain 1 cannot in any way be slowed down by ancillary control functions.

In order to ensure optimum operation of the computing unit 20, the memories 23 and 24 may at least in part be protected: a first portion of the memories 23 and 24 is reserved for the main processor 21, and a second portion of the memories 23 and 24, different from the first portion, is reserved for the auxiliary processor 22.

From the above explanation, it is clear that the main processor 21 operates entirely autonomously with regard to the auxiliary processor 22, while the auxiliary processor 22 can operate either entirely autonomously with regard to the main processor 21 or dependently on the main processor 21. In this manner, the control system 19 is able to render the execution of the basic control functions of the powertrain 1 and of the ancillary control functions completely independent and parallel.

Finally, it is important to emphasise that at the time of manufacture of the control system 19, it is only the basic control functions of the powertrain 1 that are implemented in the computing unit 20; the ancillary control functions may or may not be implemented in the computing unit 20 at another time by the manufacturer of the powertrain 1 or of the road vehicle (not illustrated) that accommodates the powertrain 1.

As a result of the many advantages offered by the above-described control system 19 for the powertrain 1, with multiprocessor architecture, said control system 19 can profitably be used for controlling any kind of internal combustion powertrain.

In particular, the control system 19 has great flexibility in the design of the control architecture, makes it readily feasible to integrate control functions implemented after the manufacture of the control system 19, and does not exhibit unwanted and/or uncontrolled interference between the basic control of the powertrain 1 and the control functions implemented after the production of the control system 19.

The invention claimed is:

1. A control system with multiprocessor architecture for an internal combustion powertrain; the control system comprising a computing unit capable of executing both basic control functions of the powertrain and ancillary control functions not directly related to the control of the powertrain; the computing unit comprises
   a main processor exclusively dedicated to executing basic functions for controlling the powertrain;
   at least one auxiliary processor dedicated to executing ancillary control functions, wherein the auxiliary processor can execute inter-processor interrupt operations in order to wait for the main processor to complete a particular computing algorithm, and the main processor does not execute inter-processor interrupt operations in order to wait for the auxiliary processor to complete a particular computing algorithm;
   a number of memories;
   a series of peripheral devices;
   at least one peripheral bus connection, to which the peripheral devices are connected; and
   a main bus connection through a cross-bar switch of the cross-bar bus type to allow the processors to communicate with the memories and with the peripheral bus connection while avoiding the occurrence of conflicting communication operations.

2. The control system of claim 1, wherein the computing unit comprises a first peripheral bus connection, which is intended for connecting slow peripheral devices, and a second peripheral bus connection, which is intended for connecting high speed peripheral devices.

3. The control system of claim 1, wherein the memories comprise either RAM type memories or ROM type memories and can at least in part be protected, a first portion of the memories being reserved for the main processor, and a second portion of the memories, different from the first portion, being reserved for the auxiliary processor.

4. The control system of claim 1, wherein the computing unit comprises a single integrated circuit that accommodates the processors, the memories, the peripheral bus connections and the main bus connection.

* * * * *